Nov. 19, 1929. K. SCHNELL 1,735,981

PLUG-IN COUPLING FOR ELECTRIC CONDUCTORS

Filed July 6, 1928

Inventor:
Karl Schnell

Patented Nov. 19, 1929

1,735,981

UNITED STATES PATENT OFFICE

KARL SCHNELL, OF ULM-ON-THE-DONAU, GERMANY

PLUG-IN COUPLING FOR ELECTRIC CONDUCTORS

Application filed July 6, 1928, Serial No. 290,730, and in Germany October 6, 1927.

Figure 1:
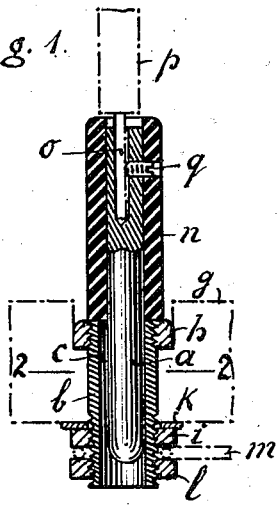
Figure 2:
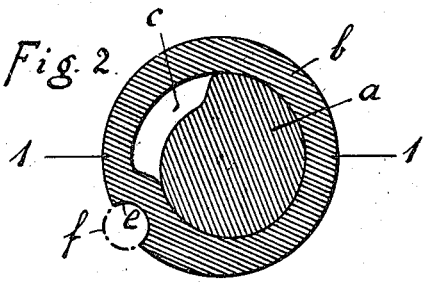
Figure 3:
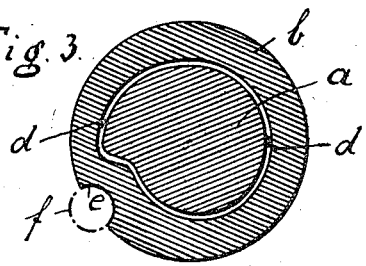

The invention relates to a plug-in coupling for electric conductors and resides in the novel shape of the parts of the coupling, which comprises a socket and cooperating pin, the latter to be partly inserted into the other, whereby better electric contact and a non-elastic coupling as compared with the well-known springy plugs is obtained. A non-elastic coupling is an advantage particularly in wireless operations. As compared with the well-known non-elastic plug-in couplings, the manufacture and manipulation are simplified by means of the new coupling. The invention will be explained in the following description with reference to the accompanying drawing, wherein:

Fig. 1 is a vertical section of a plug-in coupling taken through the center on line 1—1 of Fig. 2, and Fig. 2 is a cross section on a larger scale taken on line 2—2 of Fig. 1 while Fig. 3 differs from Fig. 2 only in the position of the component parts with regard to one another.

"$a$" is a part of the metal pin of the coupling adapted for being inserted in its cooperating socket "$b$", in order to close the electric circuit, said pin being shown in Figs. 1 and 2 in the position in which it is firmly fixed in the socket. For manipulation purposes pin "$a$" is provided with an extension piece having a cover "$n$" of non-conducting material, such as for instance vulcanite, forming a handle, which tightly fits over the extension piece. The latter has at its upper end an axial hole "$o$" for carrying the electric conductor "$p$" which is held in place by means of the screw "$q$". In addition to the pressure exerted by the tight fit of the handle "$n$" on the extension piece the screw "$q$" located in a cross hole of the handle prevents the handle from turning with regard to the extension piece when the coupling is being engaged or disengaged.

The outer surface of said pin "$a$" and the hole in the socket "$b$" carrying pin "$a$" their cross section being confined by a spiral and a line joining the ends of the spiral as is shown in Fig. 2, wherein said pin "$a$" is depicted, as in Fig. 1, in the operative position in which the tangential spirals of the pin and socket coincide for about ¾ of the circumference. This proportion may be somewhat greater or smaller, but must at all events be greater than ½. It is obvious that the coupling is non-elastic in a transverse direction, which feature is particularly desirable in wireless operations where even the slightest movement of the plugged part of the coupling will be perceived by the ear of the operator. Over about ¼ of the circumference of the pin "$a$" there is a gap "$c$" which renders it possible to turn the pin "$a$" into the position shown in Fig. 3 in which there is a peripheral space "$d$" between the pin and the socket which permits of the pin being pulled out of the socket. It will be seen from Fig. 3 that the cross section of the pin "$a$" is slightly smaller than the bore of the socket. When plugging in, the pin is inserted in the socket in the position indicated in Fig. 3 as far as it will go, and is then brought into the working position shown in Fig. 2 by turning it in a clockwise direction. Thus for engaging and disengaging purposes a torsional force only is required, but no axial pressure or tractive force. In order to prevent the socket from turning with the pin "$a$" when the latter is turned, the said socket is provided on its outer surface with an axial notch "$e$" for the insertion of a pin "$f$" half of which is carried by a corresponding notch in the hole of the holder "$g$" of the socket, as indicated by dotted lines. The said holder "$g$" is made of non-conducting material. The socket, which is partly threaded on its exterior, is attached to the holder by means of a screwed-on ring "$h$" and a nut "$i$" with washer "$k$", while another nut "$l$" is provided for clamping the electric conductor "$m$" against the socket.

The spiral section of the cylindrical pin and of the cylindrical hole of the socket may be obtained for instance by drawing long metal bars from which the parts of the coupling are cut off. In this way the mass production of the couplings is greatly simplified as compared with the known plug-in couplings, whilst at the same time the parts may be easily interchanged with one another.

I claim:

1. A plug-in coupling for electric conductors having a socket and cooperating pin, the latter to be partly inserted into the other, the part of the pin adapted for being carried by said socket and the hole in said socket each being curvilinear, its cross section being confined by a spiral and a line joining the ends of the spiral, said part of the pin having a smaller cross section than the inner section of said socket and thus being adapted for tightening both parts by turning their spirals into each other.

2. A plug-in coupling for electric conductors having a metal socket and a metal pin, the latter for being partly inserted into the other, said metal pin being partly provided with a cover of non-conducting material to be used as a handle, the part of the pin adapted for being carried in said socket and the hole in said socket being each curvilinear and confined at its surface by a spiral and a surface joining the edges of the spiral, said part of the pin being of a somewhat smaller cross section than the inner section of said socket, thus being adapted for tightening both parts by turning their spirals into each other, in combination with means provided for said metal socket and metal pin to connect one electric conductor to each and means to fix the metal socket in a holder.

In testimony whereof I affix my signature.

KARL SCHNELL.